US010169652B2

(12) United States Patent
Poole

(10) Patent No.: US 10,169,652 B2
(45) Date of Patent: Jan. 1, 2019

(54) SPATIAL EXPANSION SEISMIC DATA PROCESSING METHOD AND APPARATUS

(71) Applicant: CGG Services SA, Massy (FR)

(72) Inventor: Gordon Poole, Crawley (GB)

(73) Assignee: CGG SERVICES SAS, Massy (FR)

( * ) Notice: Subject to any disclaimer, the term of this patent is extended or adjusted under 35 U.S.C. 154(b) by 807 days.

(21) Appl. No.: 14/050,064

(22) Filed: Oct. 9, 2013

(65) Prior Publication Data

US 2014/0126781 A1 May 8, 2014

Related U.S. Application Data

(60) Provisional application No. 61/722,897, filed on Nov. 6, 2012.

(51) Int. Cl.
*G06K 9/00* (2006.01)
*G01V 1/30* (2006.01)

(52) U.S. Cl.
CPC ........... *G06K 9/0063* (2013.01); *G01V 1/301* (2013.01)

(58) Field of Classification Search
CPC .......... G01V 1/301; G01V 1/30; G01V 1/364; G06K 9/0063
USPC .... 702/14, 16, 17, 66, 67, 75, 96, 106, 155; 382/109
See application file for complete search history.

(56) References Cited

U.S. PATENT DOCUMENTS

| 5,103,429 A | 4/1992 | Gelchinsky | |
|---|---|---|---|
| 8,010,294 B2* | 8/2011 | Dorn | G01V 1/30 702/14 |
| 8,321,134 B2* | 11/2012 | Al-Saleh | G01V 1/364 702/14 |

OTHER PUBLICATIONS

Berkovitch A., et al.; "Basic formulae for multifocusing stack"; 56th Meeting and Technical Exhibition, European Association of Exploration Geophysics, Expanded Abstracts, P140; Vienna, Austria, Jun. 6-10, 1994; pp. 1-2.
Hoecht, G., et al.; "Operator-orientated CRS interpolation"; Geophysical Prospecting, vol. 57, No. 6; Nov. 2009; pp. 957-979.
Hugonnet, P., et al.; "High resolution 3D Radon filtering"; SEG Conference Proceedings; SEG Las Vegas 2008 Annual Meeting; Nov. 9-14, 2008; pp. 2492-2496.

(Continued)

*Primary Examiner* — John H Le
(74) *Attorney, Agent, or Firm* — Patent Portfolio Builders PLLC

(57) ABSTRACT

A method for processing seismic data may include receiving input seismic data ($d_i$) comprising N spatial coordinates, where the input seismic data is in a first spatial domain, expanding the N spatial coordinates of the input seismic data ($d_i$) to N' modified spatial coordinates, where N' is greater than N, to provide spatially expanded seismic data ($d_e$) that is in a second spatial domain, transforming the spatially expanded seismic data ($d_e$) to a model domain to provide model domain data ($d_m$), and generating a final image ($d_f$) of a subsurface using the model domain data ($d_m$).

20 Claims, 10 Drawing Sheets

(56) References Cited

OTHER PUBLICATIONS

Jager, R., et al.; "Common-reflection-surface stack: Image and attributes"; Geophysics, vol. 66, No. 1; Jan.-Feb. 2001; pp. 97-109.
Liu, B., et al.; "Simultaneous interpolation of 4 spatial dimensions"; SEG International Exposition and 74th Annual Meeting; Oct. 10-15, 2004; pp. 1-4; Denver, Colorado.
Poole, G., et al.; "Multi-dimensional data regularization for modern acquisition geometries"; EAGE 69th Conference & Exhibition, Expanded Abstracts; P143; Jun. 11-14, 2007; pp. 1-6; London, U.K.
Poole, G., et al.; "Effect of regularization in the migration of time-lapse data"; First Break, vol. 24, Apr. 2006; pp. 25-31.
Poole, G.; "5D Data Reconstruction Using the Anti-leakage Fourier transform"; 72nd EAGE Conference & Exhibition; B046; Jun. 14-17, 2010; pp. 1-5; Barcelona, Spain.
Schonewille, M.; "Regularization with azimuth time-shift correction"; SEG Technical Program Expanded Abstracts 2003; pp. 1917-1920; Society of Exploration Geophysicists.
Trad, D., "Five-dimensional interpolation: Recovering from acquisition constraints"; Geophysics, vol. 74, No. 6, Nov.-Dec. 2009; pp. V123-V132.
Xu, S., et al.; "Anti-leakage Fourier transform for seismic data regularization"; Geophysics, vol. 70, No. 4; Jul.-Aug. 2005; pp. V87-V95.
Canales, L. L., "Random noise reduction"; 54th SEG Annual International Meeting, Expanded Abstracts; Dec. 2-6, 1984; pp. 525-529; Atlanta, Georgia.
Adler, F.; "Robust estimation of dense 3D stacking velocities from automated picking"; 69th Annual International Meeting, SEG 1999 Expanded Abstracts; Oct. 31-Nov. 5, 1999; pp. 1-4; Houston, Texas.
Soubaras, R., "Signal-preserving random noise attenuation by the F-X projection," 64th SEG Annual International Meeting, Expanded Abstracts, 13, No. 1; Oct. 23-28, 1994; pp. 1576-1579; Los Angeles, California.
Gulunay, N., et al., "Coherency enhancement on 3D seismic data by dip detection and dip selection," 77th SEG Annual International Meeting, Expanded Abstracts, Sep. 23-28, 2007; pp. 2625-2629; San Antonio, TX.
Hampson, D., "Inverse velocity stacking for multiple elimination," Journal of the Canadian Society of Exploration Geophysicists, vol. 22, No. 1, pp. 44-55; Dec. 1986.
Le Meur et al., "Adaptive ground roll filtering," 70th EAGE Conference & Exhibition, Expanded Abstracts, Jun. 9-12, 2008; pp. 1-5; Rome, Italy.
Thomsen, L. 1999, "Converted-wave reflection seismology over inhomogeneous, anisotropic media," Geophysics vol. 64, No. 3; May-Jun. 1999; pp. 678-690.
Poole, G.; "Multi-dimensional Coherency Driven Denoising of Irregular Data"; 73rd EAGE Conference & Exhibition; May 23-26, 2011; pp. 1-6; Vienna, Austria.
Lecerf, D., "Azimuthal residual velocity analysis in offset vector for WAZ imaging", 2009, 71st EAGE Conference & Exhibition; Jun. 8-11, 2009; pp. 1-5; Amsterdam, The Netherlands.
Extended European Search Report in corresponding European Application No. EP 13 19 1799 dated Nov. 17, 2017.
V. Bardan; "Sampling Multidimensional Seismic Data—A Study Case"; XP000333725; Acoustical Imaging, vol. 19; Proceedings of the International Symposium on Acoustical Imaging; Apr. 3, 1991; pp. 829-834; New York.

* cited by examiner

SPATIAL EXPANSION SEISMIC DATA PROCESSING METHOD AND APPARATUS

CROSS-REFERENCE TO RELATED APPLICATIONS

The present application is related to, and claims the benefit of priority of, U.S. Provisional Application 61/722,897, entitled "IMPROVED INTERPOLATION OF 5D DATA BY RE-DEFINING MODEL SPACE WITH MORE THAN 5 DIMENSIONS," authored by Gordon Poole, the entire content of which is incorporated herein by reference.

BACKGROUND

Technical Field

Embodiments of the subject matter disclosed herein generally relate to the field of geophysical data acquisition and processing. In particular, the embodiments disclosed herein relate to processing data collected during a geophysical survey such as a seismic survey.

Discussion of the Background

Geophysical data is useful for a variety of applications such as weather and climate forecasting, environmental monitoring, agriculture, mining, and seismology. As the economic benefits of such data have been proven, and additional applications for geophysical data have been discovered and developed, the demand for localized, high-resolution, and cost-effective geophysical data has greatly increased. This trend is expected to continue.

For example, seismic data acquisition and processing may be used to generate a profile (image) of the geophysical structure under the ground (either on land or seabed). While this profile does not provide an exact location for oil and gas reservoirs, it suggests, to those trained in the field, the presence or absence of such reservoirs. Thus, providing a high-resolution image of the subsurface of the earth is important, for example, to those who need to determine where oil and gas reservoirs are located.

Traditionally, a land seismic survey system 10 capable of providing a high-resolution image of the subsurface of the earth is generally configured as illustrated in FIG. 1 (although many other configurations are used). System 10 includes plural receivers 12 and acquisition units 12a positioned over an area 13 of a subsurface to be explored, and in contact with the surface 14 of the ground. A number of vibroseismic or other types of sources 16 are also placed on surface 14 in an area 17, in a vicinity of area 13 of receivers 12. A recording device 18 is connected to a plurality of receivers 12 and placed, for example, in a station-truck 20. Each source 16 may be composed of a variable number of vibrators or explosive devices, and may include a local controller 22. A central controller 24 may be present to coordinate the shooting times of the sources 16. A GPS system 26 may be used to time-correlate sources 16 and receivers 12 and/or acquisition units 12a.

With this configuration, sources 16 are controlled to generate seismic waves, and the receivers 12 record the waves reflected by the subsurface. The receivers 12 and acquisition units 12a may be connected to each other and the recording devices with cables 30. Alternately, the receivers 12 and acquisition units 12a can be paired as autonomous nodes that do not need the cables 30.

The purpose of seismic imaging is to generate high-resolution images of the subsurface from acoustic reflection measurements made by the receivers 12. Conventionally, as shown in FIG. 1, the plurality of seismic sources and receivers is distributed on the ground surface at a distance from each other. The sources 16 are activated to produce seismic waves that travel through the subsurface. These seismic waves undergo deviations as they propagate. They are refracted, reflected, and diffracted at the geological interfaces of the subsurface. Certain waves that have traveled through the subsurface are detected by the seismic receivers 12 and are recorded as a function of time in the form of signals (called traces).

Referring to FIG. 2, while continuing to refer to FIG. 1, the seismic sources 16 may be moved while the receivers 12 are rotated (i.e., "rolled") from a trailing edge of the survey area 13 to a leading edge. Referring now to FIG. 3, while continuing to refer to FIGS. 1 and 2, moving the sources and receivers in the described manner provides a high density grid of source points 40 and recording points 50 over a large area with a limited number of sources 16 and receivers 12. Each source may be fired at a distinct time in order to enable each active receiver 16 to collect a unique trace for each source point 40 that is activated while it resides at the recording point 50. In some scenarios, billions of traces are collected and each trace corresponds to a midpoint 60 between a source point 40 and recording point 50. Although the intent is typically to place the sources 16 and receivers 12 at specific locations that provide a set of traces for midpoint locations 60 corresponding to a uniform grid, physical restrictions and other issues may result in non-uniform placement of the source points 40 and the receiver points 50, such as the locations shown in FIG. 3.

Recorded signals are typically processed by a migration operation to obtain an image of underground geological structures. The migration operation essentially reverses propagation of the recorded waves, resulting in convergence at the subsurface boundary. Typically, a stacking operation is performed on the migrated data, by summing energy derived from approximately the same point in the subsurface. The stacking operation increases the signal-to-noise ratio and the amplitude ratio between a primary reflection and subsequent reflections referred to as "multiples." Conducting such a process is commonly referred to as a "Common Image Gather." For example, assuming the subsurface is horizontally stratified with no lateral variation of acoustic velocities, traces from different pairs of source points and receiver points that illuminate at the same point in the subsurface for variable source-receiver distances (offsets) are those with a common midpoint 60 between the source and receiver (see FIG. 2). Ideally, such traces can be summed into a common mid-point stack trace that provides a stronger signal-to-noise ratio than an individual trace.

The waves reflected in the subsurface are recorded at arrival times that vary as a function of the offset and azimuth between the source and the receiver. For example, FIG. 4 is a 2D plot of a COCA cube that shows how the common midpoint arrival times (vertical axis) for a dipping event, display a sinusoidal timing response 70 as a function of offset (horizontal axis) and azimuth. The same phenomenon may be observed above subsurface layers, exhibiting azimuthal anisotropy, where the velocity of sound varies with azimuth. Therefore, before traces can be added, they should be corrected for these timing variations, bringing them to a common reference known as the zero offset trace. This correction may be made by a so-called moveout correction step. In the case of azimuthal anisotropy, this could be termed azimuthal moveout correction.

In general, it is considered that the time at which the same event is recorded varies as a function of the offset along a hyperbolic normal moveout (NMO) curve that depends on the average wave propagation velocity in the subsurface. For each time at zero offset, an NMO curve is determined by successive approximations of the velocity and an evaluation of the semblance of traces along the corresponding curve. The determination of NMO curves provides a means of correcting traces so as to align reflections on all traces (via a computed time shift) so that they can be "stacked" (i.e., summed).

However, most of the time, the NMO correction is not sufficiently precise and distortions remain. An additional correction is often made during a so-called residual moveout (RMO) step. In general, it may be assumed that the residual correction is of the parabolic type. On this subject, reference is made to the publication "Robust estimation of dense 3D stacking velocities from automated picking," Franck Adler, Simon Brandwood, 69th Ann. Internat. Mtg., SEG 1999, Expanded Abstracts. The authors suggest an RMO correction defined by the equation:

$$\tau(x,t) = x^2(V^{-2} - V_{ref}^{-2})/2t \qquad (1)$$

where τ is the RMO correction, x is the offset; t is the time at zero offset; $V_{ref}$ is a reference velocity function; and V is an updated velocity.

In order to provide additional data and image resolution, the trend in seismic surveys is to pair seismic sources and receivers at increasing distances from each other and record traces at increasing offsets. As a result of the increased offsets, RMO curves become increasingly more difficult to describe and the parabolic model has often been found unsatisfactory. Furthermore, typical prior art models are unable to describe RMO distortions as a function of azimuth.

In addition to issues with RMO correction, many land and ocean bottom datasets suffer from high levels of noise, which makes the task of processing and interpretation difficult. This is more pronounced for low fold datasets. Modern single sensor high fold datasets can also exhibit high noise levels due to poor coupling and ground or mud roll. For such datasets, it can be pragmatic to reduce the noise level.

De-noising algorithms are generally split into two categories: those that are designed to remove random noise and those that remove coherent noise. The removal of random noise normally relies on the fact that, while the signal is predictable, the incoherent noise is not. This principle is the basis for fx prediction filtering (Canales, L. L., "Random noise reduction," 54th SEG Annual International Meeting, Expanded Abstracts, 3, no. 1, 525-529, 1984), fx projection filtering (Soubaras, R., "Signal-preserving random noise attenuation by the F-X projection," 64th SEG Annual International Meeting, Expanded Abstracts, 13, no. 1, 1576-1579, 1994), and other coherency driven techniques (for example, Gulunay et al., "Coherency enhancement on 3D seismic data by dip detection and dip selection," 77th SEG Annual International Meeting, Expanded Abstracts, 2007).

Other de-noising algorithms attempt to mitigate the coherent noise by locating characteristics that distinguish it from the primary energy. For example, Radon demultiple makes the distinction that on normal moveout-corrected common mid-point (CMP) gathers, the primary energy is flat while the multiple energy curves downward (Hampson, D., "Inverse velocity stacking for multiple elimination," Canadian Journal of Exp. Geophysics, 22, 44-55, 1986). Other coherent energy can be distinguished through modeling and subtraction (Le Meur et al., "Adaptive ground roll filtering," 70th EAGE Conference & Exhibition, Expanded Abstracts, 2008).

For random noise, many attenuation algorithms require regularly sampled data. Thus, the irregular datasets need to be regularized prior to de-noising. The simplest method of achieving regularization is through flex binning, which duplicates traces from neighboring bins to fill holes in coverage. While this method ensures one trace per bin, the flex bin traces will often not be a good representation of what would have been recorded in those bins, particularly for data with significant dip. In addition, jitter can be apparent in the data due to irregular sampling within the bins. The application of traditional methods (such as fx prediction filtering) in such circumstances will be suboptimal because the irregularity of the sampling makes the primary energy disjointed. As such, the primary energy will be smeared and detail will be lost.

In addition to de-noising of random noise, many other seismic processing techniques, including migration, benefit from placing strict requirements on the regular spatial distribution of traces. For example, as shown in FIG. 5, regularization can increase the number of traces with a common midpoint and often increases the resolution of the resulting image. As a consequence, datasets that do not fulfill these requirements, including most 3D land surveys, will suffer from poor processing results (Poole and Lecerf, "Effect of regularisation in the migration of time-lapse data", First Break, 24, 25-31, 2006). Although not a substitute for well-sampled field data, data reconstruction or interpolation performed on pre-stacked seismic data can provide useful data preconditioning that allows processing techniques to work better, and hence provide a superior result.

For narrow-azimuth marine data, 2D and 3D reconstruction techniques have been successful, as the data have been relatively well sampled (Poole and Herrmann, "Multi-dimensional data regularization for modern acquisition geometries", 69th EAGE Conference & Exhibition, Expanded Abstracts, P143, 2007). With wide azimuth geometries, such as those commonly used for 3D land and ocean bottom node (OBN) or cable (OBC) surveys, it is necessary to use an algorithm that respects all recording dimensions simultaneously. In addition to the inline and crossline directions, this means also using the offset and azimuth, or alternatively offset-x and offset-y directions.

The concept of interpolating simultaneously in all spatial domains was first introduced by Liu et al., 2004 ("Simultaneous interpolation of 4 spatial dimensions", 74th SEG international conference). In Liu's paper, a minimum weighted norm method (MWNI) is used to derive a 5D Fourier transform of the data. The Fourier transform represents a continuous model, which can be used to reconstruct energy at any spatial coordinate. The method was further developed by Trad, 2009 ("Five-dimensional interpolation: Recovering from acquisition constraints" Geophysics, 74, V123). The anti-leakage Fourier transform (Xu et al., "Anti-leakage Fourier transform for seismic data regularization", Geophysics, 70, 87-95 2005) was also extended to 5D by Poole, 2010 ("5D data reconstruction using the anti-leakage Fourier transform", EAGE conference proceedings). Variants of the anti-leakage method, sometimes referred to as 'matching pursuit,' may also be used. (It should be noted that, as used herein, the term 'anti-leakage' relates to an iterative procedure wherein calculated model components are reverse transformed, and then subtracted from the input data, before additional model components are determined.)

While working in 5D enables the best possible chance of deriving an accurate Fourier representation of the data, a number of issues remain. For example, most 5D algorithms work on sub-cubes of data, where it is assumed that events are pseudo-linear. In the inline and crossline directions, this assumption is generally valid. While this assumption is also valid in the offset-x and offset-y directions, sampling in these directions is often so coarse that aliasing can become a problem. For this reason, it is often preferred to perform 5D reconstruction in the inline-crossline-offset-azimuth domain.

While windowing in the azimuth direction is possible to make event timing as a function of azimuth pseudo-linear, coarse input sampling often requires that a full 360-degree model be used. This also takes advantage of the fact that a continuation of data in azimuth dimension satisfies Fourier assumptions. However, by working with 360 degrees, the data is no longer linear, and linear sparseness constraints are no longer suitable.

The approach of Schonewille, "Regularization with azimuth time-shift correction", SEG international conference 2003, can be adapted into the 5D data reconstruction scheme to reduce the impact of timing variations relating to dipping reflectors. This relates to deriving time shifts as a function of event dip and two way travel time to flatten the sinusoidal behavior shown in FIG. 4. The shifts may then be re-instated on the reverse transform, depending on the output coordinates. In a more complex geology, e.g., where there is anisotropy, this is less effective.

An alternative method to improving the signal-to-noise ratio of data by noise filtering or data interpolation is the 'common-reflection surface' (CRS) approach. This method derives a multi-parameter parametric description of the reflection timing of the data, which also provides a depth velocity model of the dataset. Such a concept is described by Jager, et al. 2001 ("Common-reflection-surface stack: Image and attributes", Geophysics, Vol 66, pp 97-109). The common-reflection-surface parameters describe the travel times of the main events in the data and were initially used for stacking. Instead of stacking in the common midpoint domain after normal moveout, the common reflection surfaces (which describe events in space as well as offset) were used to improve stack coherence by stacking energy along surfaces in space as well as offset. This method proved very powerful at revealing weak reflections in areas of poor signal-to-noise ratio.

The use of CRS parameters was later extended to improve the coherence of pre-stack data through averaging or median filtering the data along the defined surfaces. Later still, Hoecht et al, 2009, ("Operator-orientated CRS interpolation", Geophysical prospecting, V57, pp 959-979) used simple interpolation operators along the CRS surfaces for the purpose of 3D data interpolation. The common-reflection-surface parameters define the travel times of the main reflectors in the data, but are not a linear representation of the data itself. A similar method to CRS, 'Multi-focusing' is also in the literature; Berkovitch, et al 1994 ("Basic formula for multifocusing stack", 56th Meeting, European Association of Exploration Geophysics, Expanded Abstracts, p. 140) and U.S. Pat. No. 5,103,429 (granted April 1992).

Despite all of the foregoing approaches, there is a long-standing need to provide a model of a seismic dataset that facilitates a variety of applications such as de-noising and regularization. Preferably, pre-processing seismic data and providing such a model would provide a framework for seismic processing that would simplify seismic processing and generate better seismic images.

SUMMARY

As detailed herein, a method for processing seismic data may include receiving input seismic data ($d_i$) comprising N spatial coordinates, where the input seismic data is in a first spatial domain, expanding the N spatial coordinates of the input seismic data ($d_i$) to N' modified spatial coordinates, where N' is greater than N, to provide spatially expanded seismic data ($d_e$) that is in a second spatial domain, transforming the spatially expanded seismic data ($d_e$) to a model domain to provide model domain data ($d_m$), and generating a final image ($d_f$) of a subsurface using the model domain data ($d_m$). An apparatus corresponding to the above method is also described herein.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a novel method to process seismic data includes receiving input seismic data comprising N spatial coordinates in a first spatial domain, expanding the N spatial coordinates of the input seismic data to N' modified spatial coordinates, where N' is greater than N, to provide spatially expanded seismic data that is in a second spatial domain. The method also includes transforming the spatially expanded seismic data to a model domain to provide model domain data, inverse transforming the model domain data, or a processed variation thereof, to an output domain to provide output seismic data, and generating a final image of the subsurface using the output seismic data. The method essentially provides a seismic processing framework that may be used to achieve a variety of objectives and applications. For example, the method may be used to de-noise seismic data, regularize data to bin centers, fill gaps in data acquisition coverage, increase trace density, increase CMP fold, enable a reduction in bin size, estimate subsurface velocity parameters, and improve offset and azimuth distribution.

Figure 6:
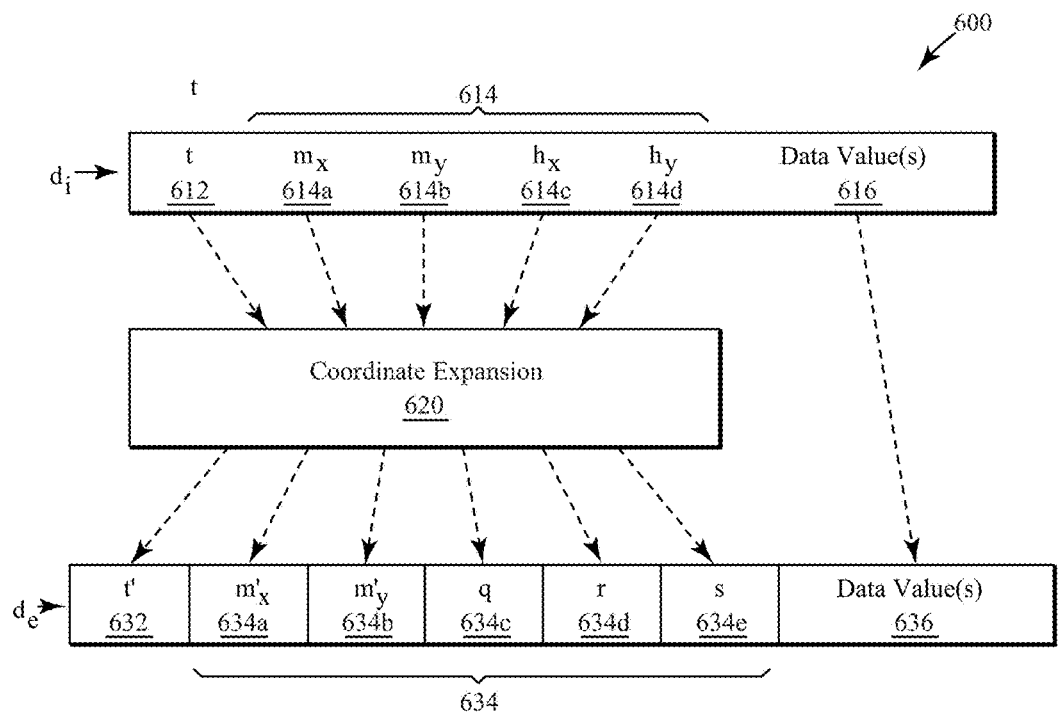
FIG. 6 is data flow diagram depicting one embodiment of a coordinate expansion method.
Figure 7:
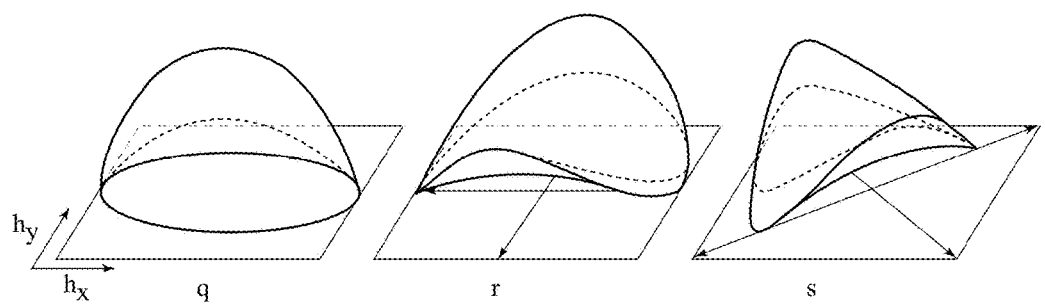
FIG. 7 is a 3D plot depicting one embodiment of a domain for representing spatially expanded seismic data.

FIG. 6 is data flow diagram and FIG. 7 is a 3D plot depicting one embodiment of a coordinate expansion method 600. As depicted, the coordinate expansion method 600 includes receiving input seismic data ($d_i$) and conducting a coordinate expansion operation 620 to provide spatially expanded seismic data ($d_e$). Regularization using the spatially expanded seismic data ($d_e$) may improve the quality of seismic images derived from the input seismic data ($d_i$).

Figure 1:
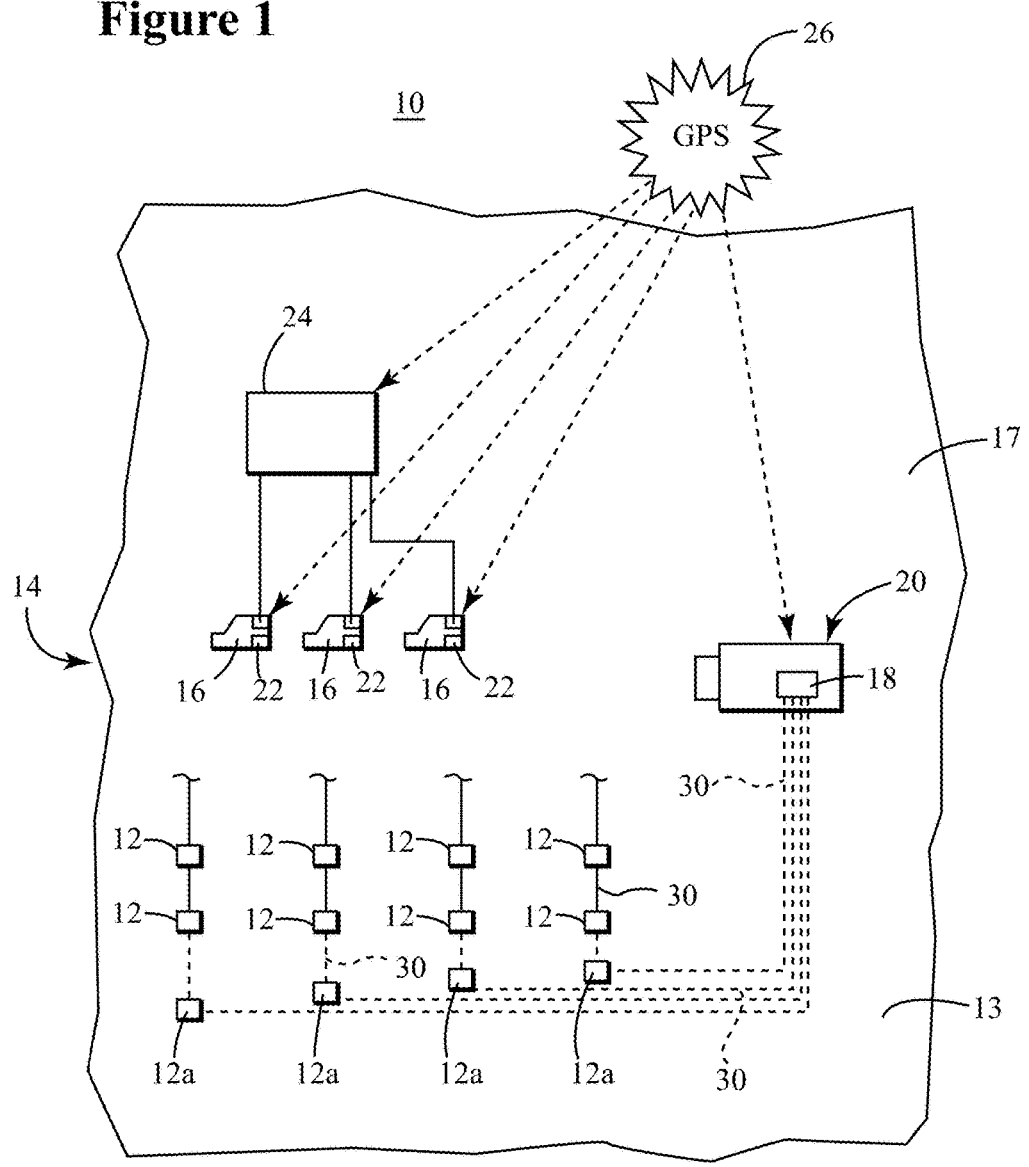
FIG. 1 is a schematic diagram depicting a traditional land seismic survey system.
Figure 2:
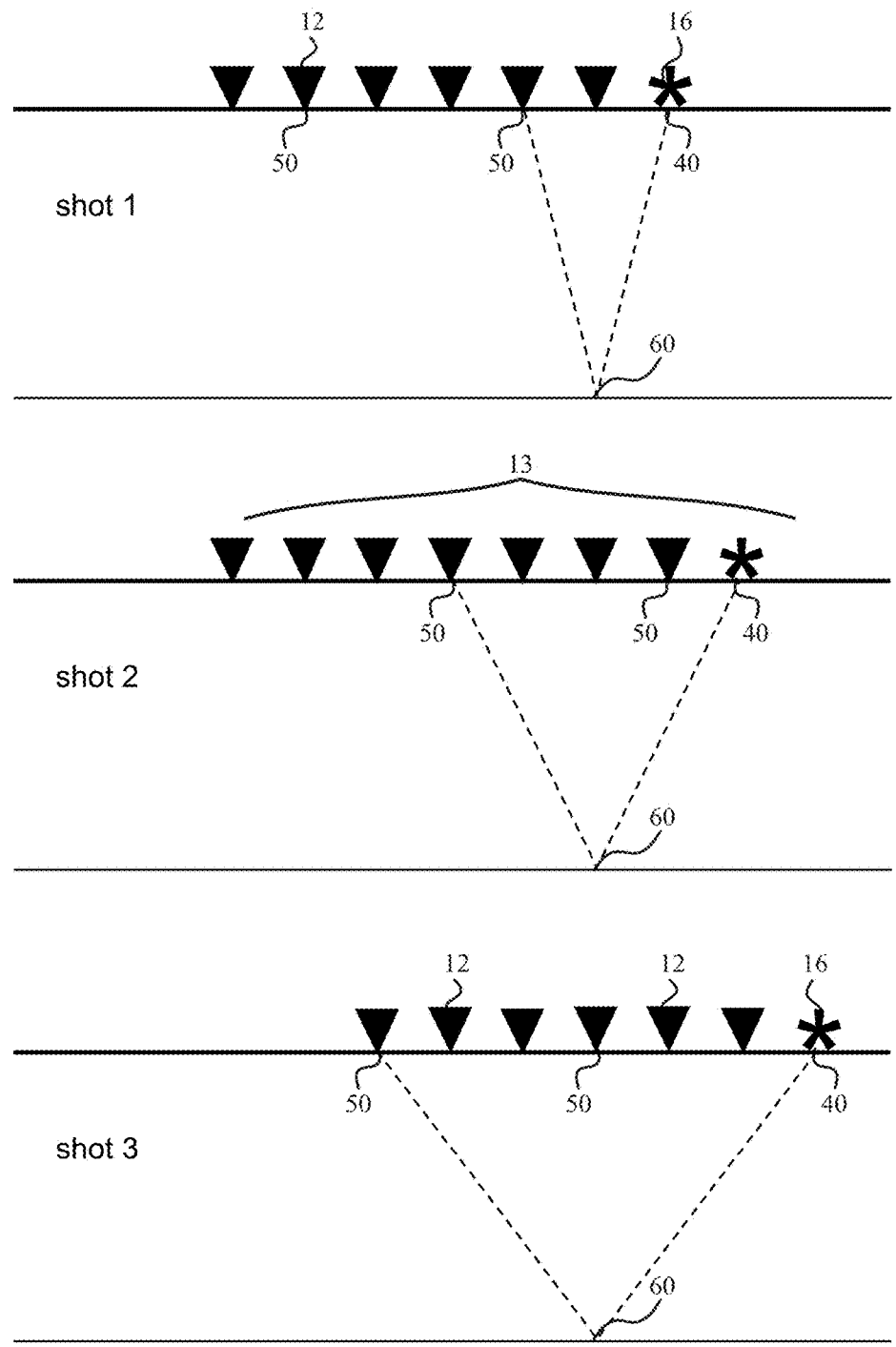
FIG. 2 is a schematic diagram depicting the concept of a common midpoint in a rolling geophysical survey.
Figure 3:
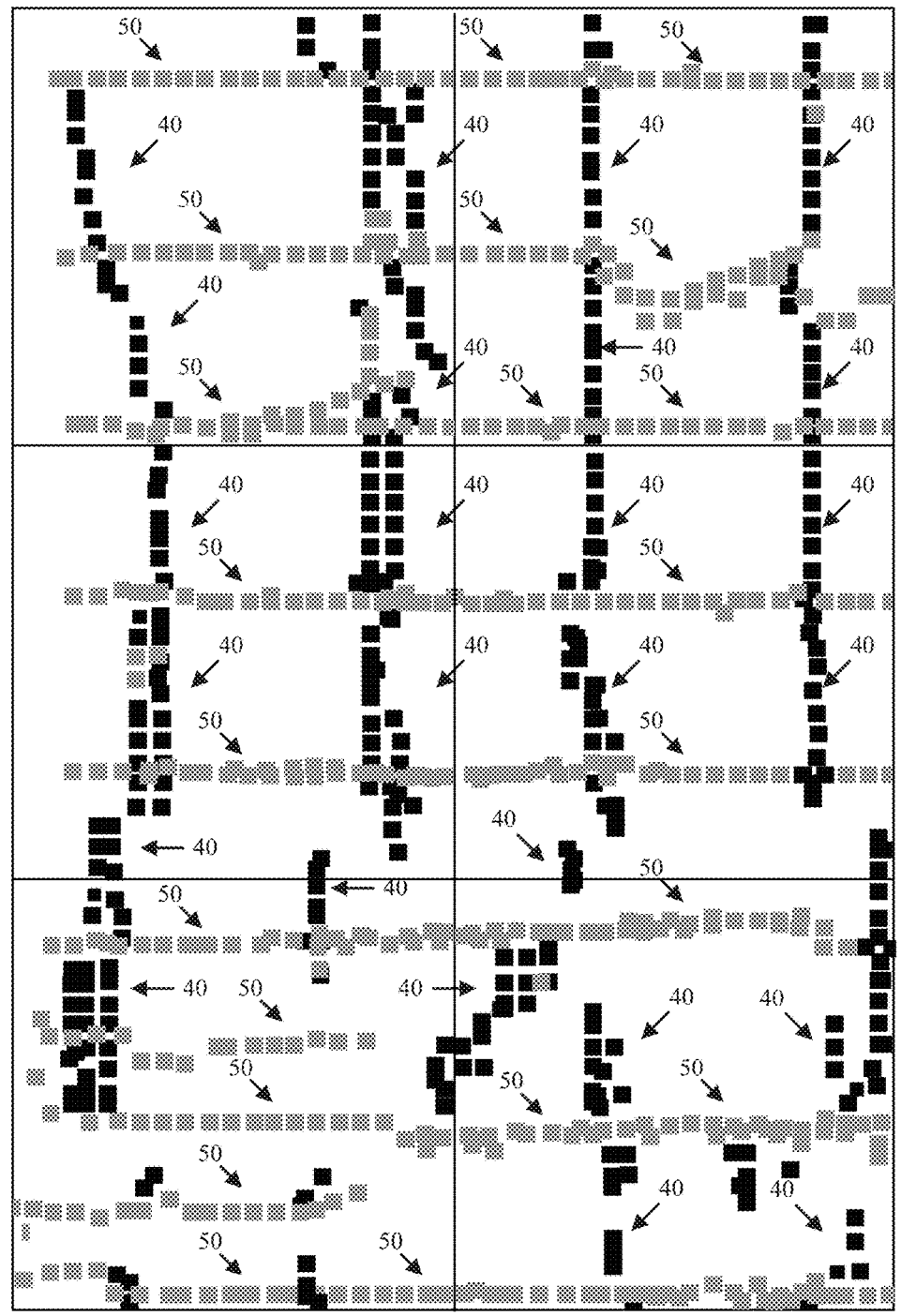
FIG. 3 is a source receiver location plot for a portion of a typical survey.
Figure 4:
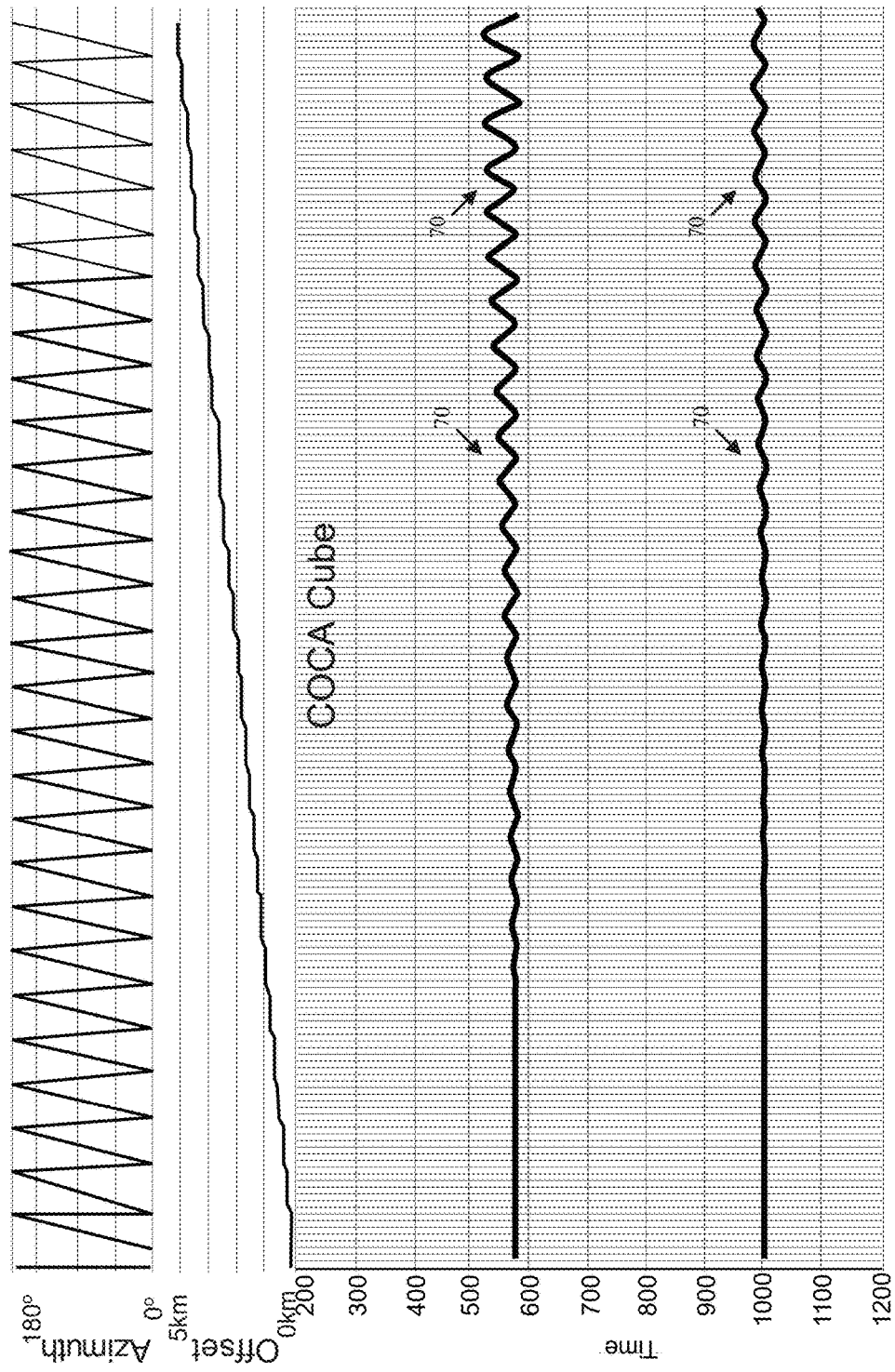
FIG. 4 is a 2D plot of a COCA cube for a dipping event.
Figure 5:
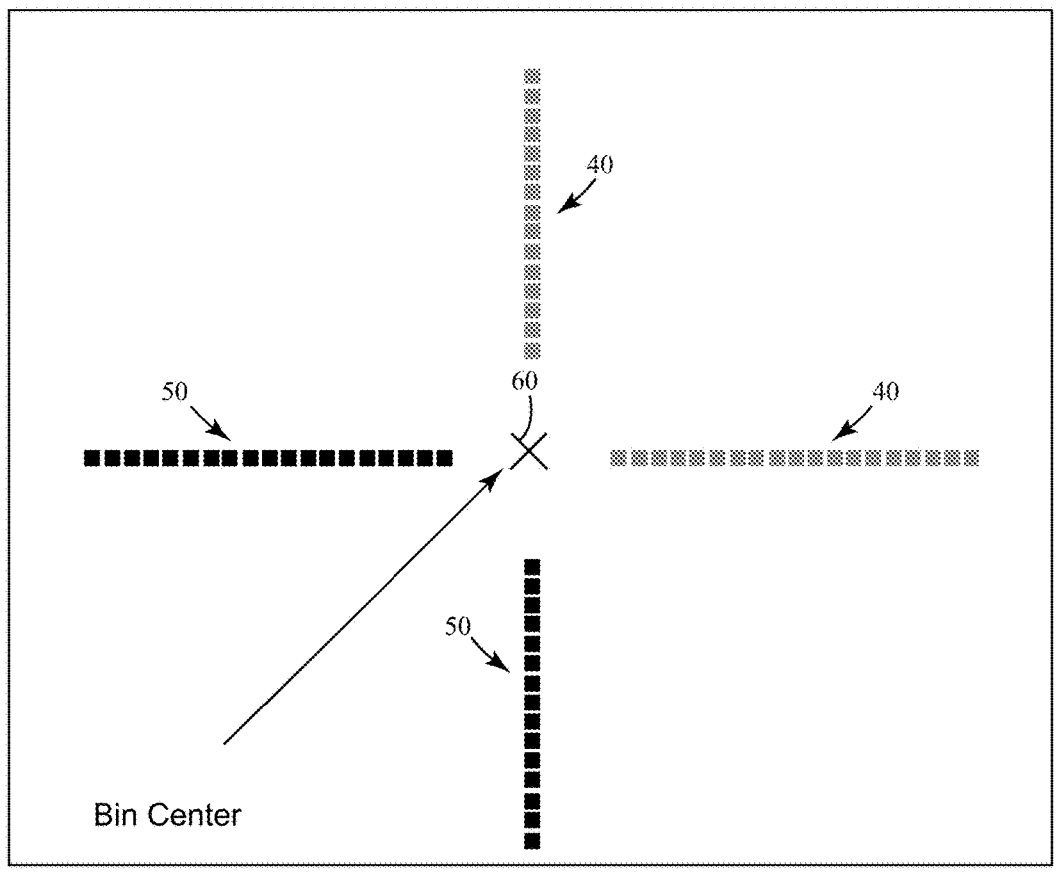
FIG. 5 is schematic diagram depicting the concept of regularization in a geophysical survey.

The input seismic data ($d_i$) may include a temporal coordinate (i.e., index) 612, a set of N spatial coordinates 614, and one or more data values 616. Specifically, each combination of the coordinates 612 and 614 may have one or more data values that correspond to sensor data provided by a receiver 12 depicted in FIG. 1 (or the like) at a specific time and location defined by the temporal coordinate 612 and the N spatial coordinates 614. In some embodiments, such as when multi-component sensors are used, the data values 616 may include multiple data values, each corresponding to a different sensor.

The temporal coordinate 612 may indicate a time offset for the data values 616. The time offset may be an elapsed time relative to the onset of a specific seismic event, e.g., a time break event corresponding to a particular trace. The set of spatial coordinates 614 may indicate spatial locations of a paired source 16 and receiver 12 corresponding to a trace. The trace may comprise the input seismic data ($d_i$).

In the depicted embodiment, the spatial coordinates 614 include an inline midpoint coordinate 614a (i.e., $m_x$), a crossline midpoint coordinate 614b (i.e., $m_y$), an inline offset 614c (i.e., $h_x$), and a crossline offset 614d (i.e., $h_y$). The inline and crossline coordinates may be a measured distance to a midpoint for a paired source 16 and receiver 12, relative to an inline and crossline coordinate system selected for a survey. Similarly, the inline and crossline offsets may be measured offsets in the inline and crossline directions relative to the midpoint between the paired source 16 and receiver 12. Although the depicted spatial coordinates 614 are specified by inline and crossline coordinates and offsets, the invention is not limited thereto. For example, the spatial coordinates 614 may be specified by an azimuth and distance rather than the inline and crossline distances. Alternatively, shot-x, shot-y, receiver-x, and receiver-y coordinates may be used as input to the coordinate expansion method 600. In the case that source and receivers are on different datums (for example ocean bottom surveys which utilize receivers at the sea bed and sources towed by a vessel), it may be necessary to use the asymptotic conversion point (ACP) instead of the midpoint for the spatially expanded coordinate. Alternatively, common conversion point (CCP) which is a function of time may be used. Both ACP and CCP coordinates are functions of the spatial coordinates as described in Thomsen, L. 1999, "Converted-wave reflection seismology over inhomogeneous, anisotropic media," Geophysics Vol 64, pp 678 to 690.

The spatially expanded seismic data ($d_e$) may include a temporal coordinate 632 (i.e., t'), an expanded set of N' modified spatial coordinates 634, and one or more data values 636. In the depicted embodiment, the modified spatial coordinates 634 include an inline midpoint coordinate 634a (i.e., $m'_x$), a crossline midpoint coordinate 634b (i.e., $m'_y$), a sum of squared offsets 634c (i.e., q), a difference of squared offsets 634d (i.e., r), and an offset product 634e (i.e., s).

The coordinate expansion operation 620 receives the input seismic data ($d_i$) in a first domain and provides the spatially expanded seismic data ($d_e$) in a second domain. The first domain and the second domain may be spatial domains. In certain embodiments, the coordinate expansion operation 620 is conducted by executing a mapping function for each coordinate associated with the spatially expanded seismic data ($d_e$). In the depicted embodiment, the mapping function for the time coordinate t' and the spatial coordinates $m'_x$ and $m'_y$ is an identity function for the temporal coordinate 612 and the spatial coordinates 614a and 614b, respectively. Consequently, the mapping functions for t', $m'_x$, and $m'_y$ are t'=t, $m'_x=m_x$ and $m'_y=m_y$, respectively. In contrast, and as shown in FIG. 7, the depicted mapping functions for q, r, and s are $q=(h_x^2+h_y^2)$, $r=(h_x^2-h_y^2)$, and $s=(2h_xh_y)$, respectively.

One of skill in the art will appreciate that using modified spatial coordinates such as q, r, and s in the spatially expanded seismic data ($d_e$) may effectively replace non-linear responses in the input seismic data ($d_i$) 636 with pseudo-linear (i.e., nearly linear) responses in the spatially expanded seismic data ($d_e$). Consequently, model domain representations of the spatially expanded seismic data ($d_e$) may be more effective than model domain representations of the input seismic data ($d_i$).

One of skill in the art will also appreciate that while the data flow diagram of FIG. 6 (and other data flow diagrams included herein) depicts processing a single set of coordinates and corresponding data values, the depicted processing is intended to be conducted on each element or entry of a seismic dataset (e.g., every element of $d_i$ and $d_e$).

Figure 8:
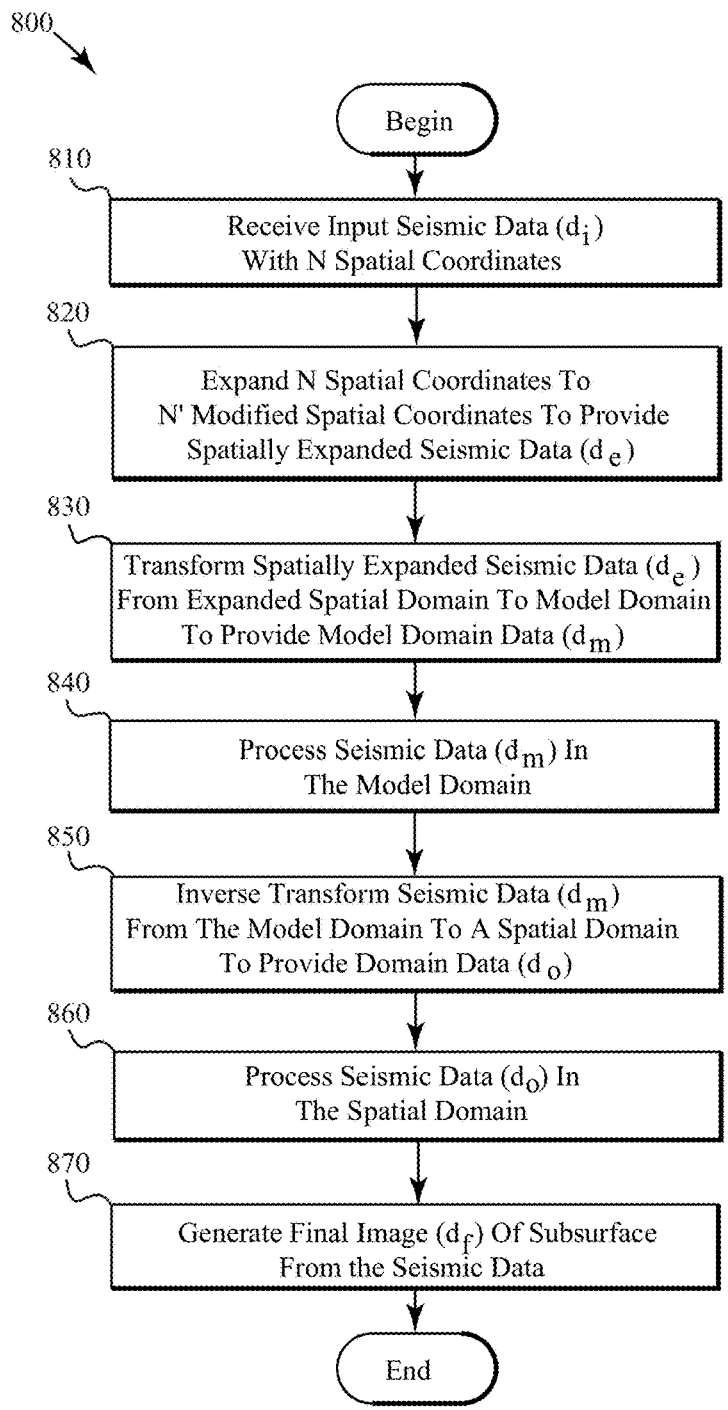
FIG. 8 is flowchart diagram of a method for processing seismic data.
Figure 9:
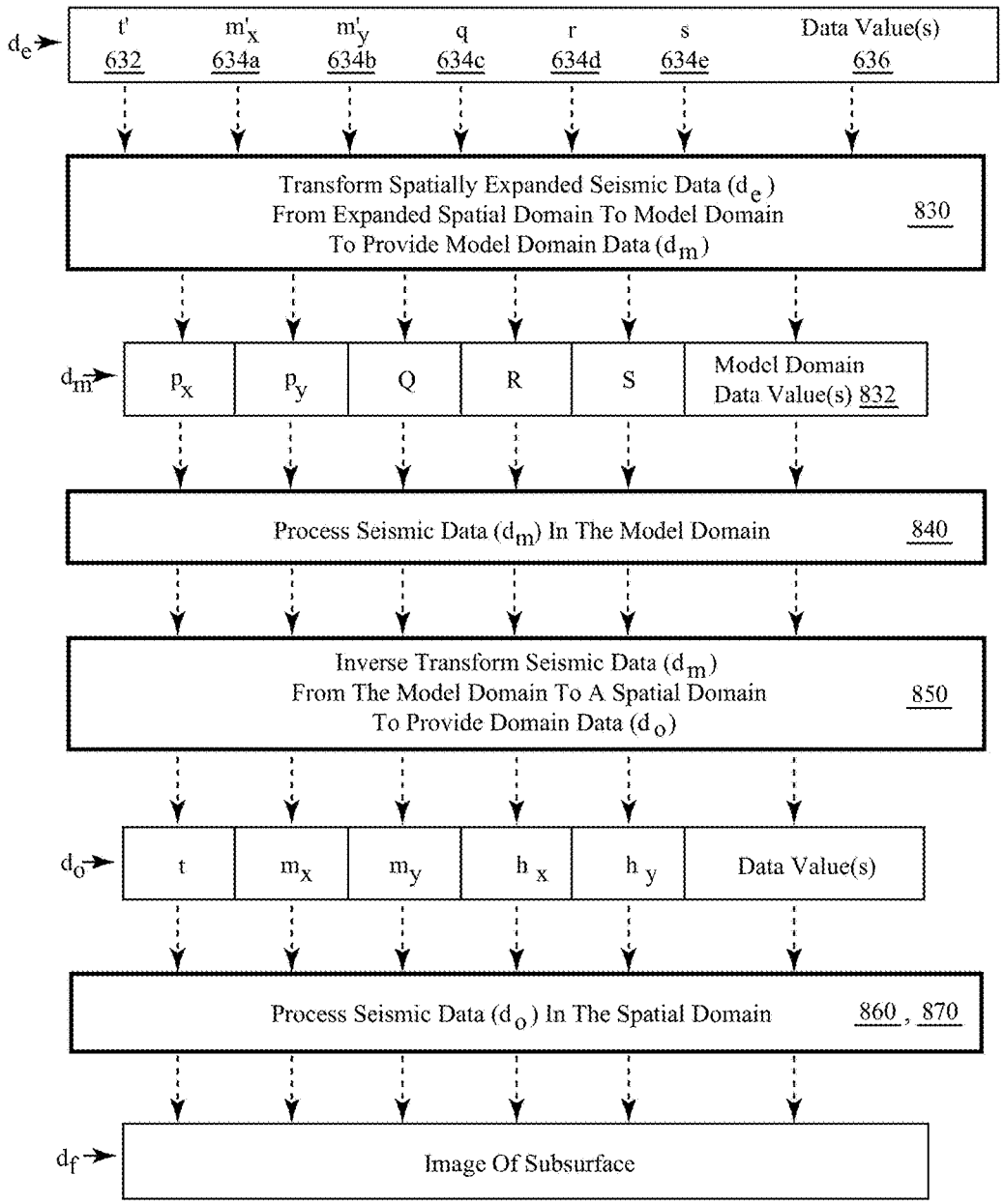
FIG. 9 is dataflow diagram further depicting the method of FIG. 8.

FIG. 8 is flowchart diagram and FIG. 9 is corresponding dataflow diagram of a method 800 for processing seismic data. As depicted, the method 800 includes receiving 810 input seismic data ($d_i$), expanding 820 one or more spatial coordinates to provide spatially expanded seismic data ($d_e$), transforming 830 the spatially expanded seismic data ($d_e$) to a model domain, processing 840 the seismic data in the model domain, inverse transforming 850 the seismic data from the model domain to a spatial domain, processing 860 the seismic data in the spatial domain, and generating 870 a final image of a subsurface. Processing seismic data according to the method 800 may provide a final image of subsurface that is superior to images generated by existing methods.

Receiving 810 input seismic data ($d_i$) and expanding 820 one or more spatial coordinates (i.e., N spatial coordinates) to provide spatially expanded seismic data ($d_e$) may be conducted in the manner depicted in FIGS. 6 and 7 and described in the associated description. The received input seismic data ($d_i$) may be in a first domain. Expanding 820 one or more spatial coordinates associated with the first domain may result in spatially expanded seismic data ($d_e$) with N' modified spatial coordinates, where N' is greater than N, that is in a second domain. The first and second domains may be spatial domains. The input seismic data ($d_i$) and the spatially expanded seismic data ($d_e$) may comprise one or more traces that correspond to a common midpoint for paired sources and receivers.

In one embodiment, the N spatial coordinates of the input seismic data ($d_i$) comprise an inline midpoint ($m_x$), crossline midpoint ($m_y$), inline offset ($h_x$) and a crossline offset ($h_y$), and the N' modified spatial coordinates of the spatially expanded seismic data ($d_e$) comprise coordinates $m'_x$, $m'_y$, q, r, and s corresponding to $m_x$, $m_y$, $(h_x^2+h_y^2)$, $(h_x^2-h_y^2)$ and $(2 \cdot h_x \cdot h_y)$, respectively (see FIG. 7).

Subsequent to expanding 820, the method 800 may be advanced by transforming 830 the spatially expanded seismic data ($d_e$) to a model domain. The model domain may be any domain that provides effective modeling of seismic data such as a slowness domain, a wavenumber domain, a frequency domain, a q-domain, an r-domain, an s-domain, a hyperbolic domain, a shifted apex hyperbolic domain, a horizontal transverse isotropy (HTI) domain, a vertical transverse isotropy (VTI) domain, an orthorhombic anisotropy domain, a CRS parameters domain, and the like. The model domain is a representation of the spatial domain through a mathematical operation. Typically, this is a linear operation which may be stated as equation d=Lm, where d is a vector containing the known input data, m is a vector which contains the unknown model parameters, and L is a matrix which acts as a linear operator. In some embodiments, the operator L converts each spatial dimension as a function of time to a corresponding model domain dimension and each model domain dimension represents the seismic data as a function of frequency, slowness, velocity, wavenumber, momentum, offset, or the like, rather than time. Furthermore, each model domain data value may correspond to a unique combination of the model domain coordinates. In the depicted embodiment shown in FIG. 9, each model domain data value 832 within the model domain data array ($d_m$) has slowness coordinates $p_x$ and $p_y$, as well as offset related terms Q, R, and S that respectively correspond to spatial coordinates $m'_x$, $m'_y$, q, r, and s for the spatially expanded seismic data ($d_e$).

In certain embodiments, the transforming operation 830 is accomplished by conducting an anti-leakage transform that iteratively selects one or more peaks in the model domain and subtracts the inverse transform of those peaks from the spatially expanded seismic data ($d_e$). Using an anti-leakage transform for the transforming operation 830 may reduce the effect of model domain discretization and result in less noise in the model domain data ($d_m$) than a conventional transform. See, for example, Xu et al. 2005, cited in the background section of this application and "Multi-dimensional Coherency Driven Denoising of Irregular Data" authored by G. Poole, EAGE conference proceedings 2011. In other embodiments, the transforming operation 830 is accomplished by conducting an inversion operation such as a least squares inversion, a Cauchy norm, an l1, or other inversion. See, for example, Trad 2009, cited in the background section of this application.

Processing 840 the seismic data in the model domain may include processing the model domain data ($d_m$) with a variety of techniques such as scaling, thresholding, convolution, survey matching or filtering. In some embodiments, the model domain data ($d_m$) is processed to remove noise therefrom (i.e., de-noising the model domain data). The noise may be random noise such as Gaussian or white noise, or coherent noise such as diffraction noise, ground roll, surface or interbed multiple energy, or interference noise. In one embodiment, de-noising the model domain data ($d_m$) is accomplished by adjusting specific coefficients of the model domain data ($d_m$). For example, the coefficients of the model domain data ($d_m$) associated with signal may be increased while coefficients of the model domain data ($d_m$) associated with noise may be decreased. In another embodiment, a model domain may be derived for more than one dataset, for example vintages from a time-lapse project or surveys to be merged. In the model domain, a convolutional matching filter is derived to match each dataset to a reference. The matching filter may be in one or more dimensions.

Processing 840 the seismic data in the model domain may also include estimating velocity parameters for the subsurface. In one embodiment, velocity parameters for the subsurface are estimated by computing and selectively picking residual anisotropic moveout parameters. For more information regarding computing and picking residual anisotropic moveout parameters see, for example, "Azimuthal residual velocity analysis in offset vector for WAZ imaging", Lecerf, D., Navion, S., and Boelle, J. 2009, 71st EAGE conference.

Inverse transforming 850 the seismic data from the model domain to a spatial domain may include conducting an inverse transform that transforms the model domain data ($d_m$) to output domain data ($d_o$) in an output domain. The output domain may be identical to the input domain, the spatially expanded domain, or another domain that is appropriate for forming a final image of the subsurface. One advantage of conducting an inverse transform from a model domain to a spatial domain such as the output domain is that the inverse transformed data may be computed at any desired coordinate or set of coordinates. Consequently, the output domain may have non-regularized coordinates that correspond to the input domain, the spatially expanded domain, or some other domain. Alternately, the output domain may have regularized coordinates. The use of regularized coordinates may increase the fidelity of the final image. The input domain, spatially expanded domain, and output domains may be spatial domains.

Processing 860 the seismic data in the spatial domain may include a number of seismic data processing techniques such as correlation, convolution, survey matching, filtering, or the like. The processing techniques may leverage the input seismic data ($d_i$) in addition to the output domain data ($d_o$). In one embodiment, processing 860 the seismic data in the spatial domain includes outputting a noise estimate and subtracting the noise estimate from the original input data. The subtraction may be achieved with adaptive-subtraction, a well-known method used in demultiple operations.

Generating 870 a final image ($d_f$) of a subsurface may include directly or indirectly using the model domain data ($d_m$) to generate the final image ($d_f$). For example, generating a final image ($d_f$) of a subsurface may include conducting a stacking operation on the output domain data ($d_o$) that provides a high-resolution image of the subsurface associated with the input seismic data. In one embodiment, the model domain data ($d_m$) comprises a noise model and generating 870 the final image ($d_f$) of the subsurface is accomplished by subtracting the output seismic data ($d_o$) from the input seismic data ($d_i$) or the spatially expanded seismic data ($d_e$). The final image ($d_f$) of the subsurface may communicate information about the subsurface including layer boundaries, velocity parameters, saturation, porosity, permeability, amplitude variation with offset or azimuth, time-lapse differences, or the like.

One of skill in the art will recognize that operations 840 to 870, as well as other operations described herein and depicted in the drawings, may be integrated, and in many cases reordered, into processing sequences that accomplish the objectives of the operations and methods presented herein without following the precise sequence of operations presented herein. One of skill in the art will also appreciate that the operations of processing 860 the seismic data in the spatial domain, as well as processing 840 the seismic data in the model domain, are flexible operations that may be dependent on specific processing objectives. Furthermore, they may be optional operations. For example, input seismic data can be regularized by expanding 820 one or more spatial coordinates of the input seismic data ($d_i$) to provide spatially expanded seismic data ($d_e$), transforming 830 the spatially expanded seismic data ($d_e$) to a model domain, inverse transforming 850 the seismic data from the model domain to a spatial domain with regularized coordinates and generating 870 a final image of a subsurface. In such a scenario, and other scenarios, the operations of processing 840 the seismic data in the model domain and processing 860 the seismic data in a spatial domain are entirely optional operations.

The methods presented above spatially expand input seismic data to additional spatial dimensions and thereby provide a novel framework for seismic processing. All recording dimensions of an input seismic dataset (e.g., N=4) are utilized simultaneously (including inline and crossline midpoint coordinates for paired sources and receivers) and spatially expanded resulting in a robust, spatially consistent, model of the data. The spatial consistency achieved by the methods disclosed herein, are not achievable with lower dimensional subsets of the data (e.g., where N<4 or where inline and crossline midpoint information for paired sources and receivers is neglected) or on datasets that are not spatially expanded to N'>=5. For example, when processing an offset volume, a subset of data is typically selected from the input seismic data. Consider the case where N=2 and the dimensions are mx and my. Any model resulting from this subset would be continuous in mx and my, but not constrained by hx or hy. Likewise, with any subset where N<4 the resulting model would be unconstrained by one or more dimensions of the input seismic data. The simultaneous use of all recording dimensions (i.e., directions) avoids processing across discontinuities in the data and issues resulting therefrom such as jitter within an offset volume relating to variations in offset and azimuth.

Figure 10:
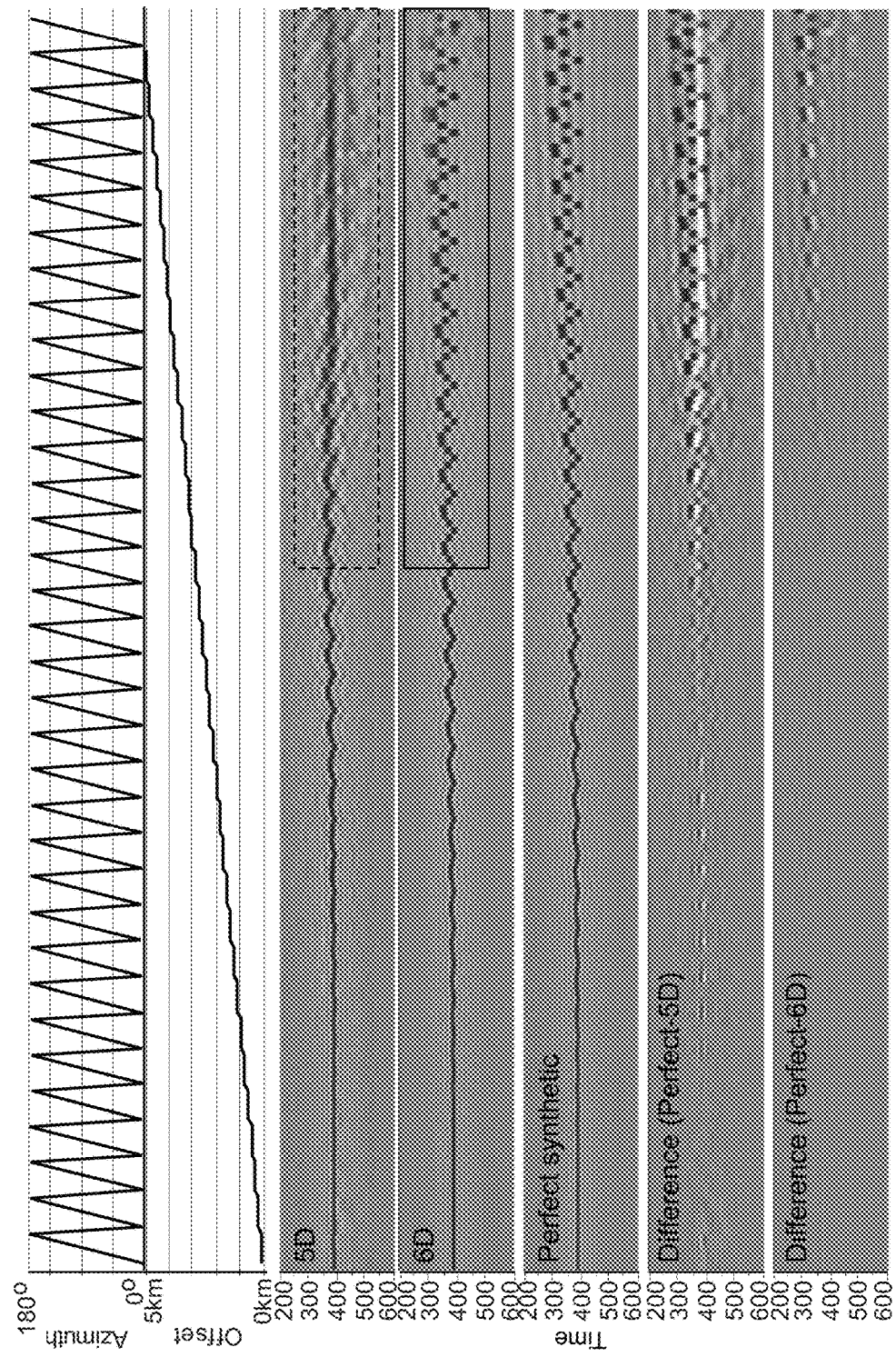
FIG. 10 is set of 2D plots comparing seismic data regularization conducted with the methods disclosed herein to seismic data regularization achieved by conventional methods.

The framework for seismic processing provided by the methods disclosed herein provides unexpectedly superior results. For example, FIG. 10 compares the results of conventional 5D regularization with spatially expanded (i.e., 6D) regularization achieved via the methods disclosed herein. Specifically, a synthetic input dataset ($d_i$) with N=4 spatial dimensions (mx, my, hx, and hy) and one time dimension (commonly referred to as a 5D dataset) was generated by randomly sampling mx, my, hx, and hy for a layer with azimuthal anisotropy in the order of 5 to 10%. The synthetic input dataset ($d_i$) was subsequently spatially expanded via the coordinate expansion operation (620, 820) to provide spatially expanded seismic data ($d_e$) (essentially a 6D dataset) with N'=5 spatially expanded coordinates ($m'_x$, $m'_y$, q, r, and s corresponding to $m_x$, $m_y$, $h_x^2 + h_y^2$, $h_x^2 - h_y^2$ and $2 \cdot h_x \cdot h_y$, respectively). Subsequently, the spatially expanded seismic data ($d_e$) (i.e., the 6D dataset) was transformed via the transforming operation 830 to provide model domain data ($d_m$). Regularization was achieved by inverse transforming 850 the model domain ($d_m$) to a spatial domain with regularized coordinates. The generated input seismic data was also processed via conventional 5D techniques (i.e., without spatial expansion). The results of the two techniques are shown in the first two panels of FIG. 10 (labeled 5D and 6D respectively) and compared to an ideal solution for the synthetically generated data labeled as 'Perfect synthetic'. The differences were calculated to quantify the error of the interpolation required for regularization as shown in the lower two panels (labeled Perfect—5D and Perfect—6D) of FIG. 10. One of skill in the art will appreciate that the 6D results are markedly superior to the 5D results and that such a markedly superior difference is unexpected to one of skill in the art that does not have the benefit of hindsight.

In addition to unexpectedly superior results, one of skill in the art can also appreciate the simplicity of the various embodiments provided herein and the many benefits provided thereby. For example, the embodiments disclosed herein may be used to reduce noise, regularize data to bin centers, fill gaps in data acquisition coverage, generate data relating to new shot lines, generate data relating to new receiver lines, increase trace density, increase fold, estimate subsurface velocity parameters, enable a change in bin size, and improve offset and azimuth distribution.

Figure 11:
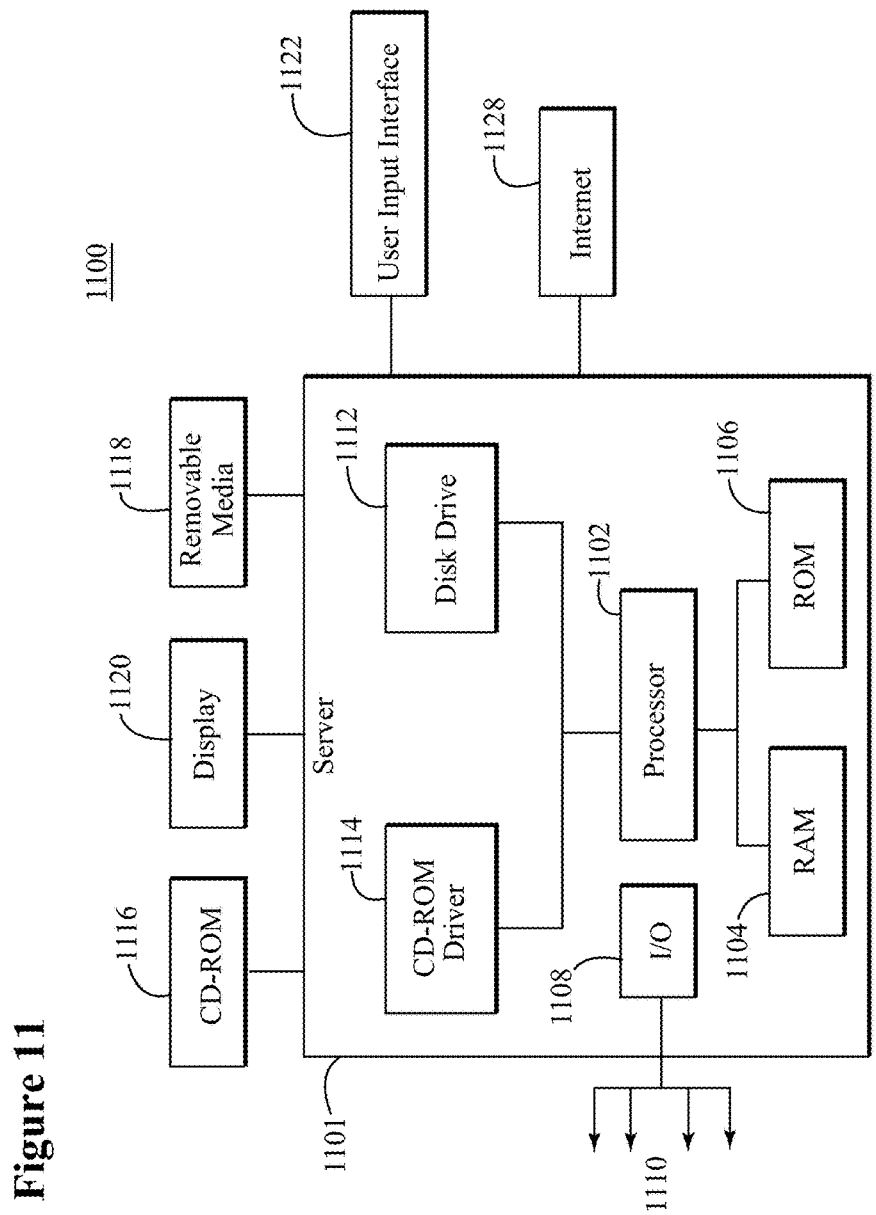
FIG. 11 is a block diagram of a computing device for processing seismic data.

The above-discussed procedures and methods may be implemented in a computing device illustrated in FIG. 11. Hardware, firmware, software or a combination thereof may be used to perform the various steps and operations described herein. The computing device 1100 of FIG. 11 is an exemplary computing structure that may be used in connection with such a system.

The exemplary computing device 1100 suitable for performing the activities described in the exemplary embodiments may include a server 1101. Such a server 1101 may include a central processor (CPU) 1102 coupled to a random access memory (RAM) 1104 and to a read only memory (ROM) 1106. The ROM 1106 may also be other types of storage media to store programs, such as programmable ROM (PROM), erasable PROM (EPROM), etc. The processor 1102 may communicate with other internal and external components through input/output (I/O) circuitry 1108 and bussing 1110, to provide control signals and the like. The processor 1102 carries out a variety of functions as are known in the art, as dictated by software and/or firmware instructions.

The server 1101 may also include one or more data storage devices, including disk drives 1112, CDDROM drives 1114, and other hardware capable of reading and/or storing information such as DVD, etc. In one embodiment, software for carrying out the above-discussed steps may be stored and distributed on a CDDROM or DVD 1116, a USB storage device 1118 or other form of media capable of portably storing information. These storage media may be inserted into, and read by, devices such as the CDDROM drive 1114, the disk drive 1112, etc. The server 1101 may be coupled to a display 1120, which may be any type of known display or presentation screen, such as LCD displays, plasma display, cathode ray tubes (CRT), etc. A user input interface 1122 is provided, including one or more user interface mechanisms such as a mouse, keyboard, microphone, touchpad, touch screen, voice-recognition system, etc.

The server 1101 may be coupled to other devices, such as sources, detectors, etc. The server may be part of a larger network configuration as in a global area network (GAN) such as the Internet 1128, which allows ultimate connection to the various landline and/or mobile computing devices.

The disclosed exemplary embodiments provide a computing device, a method for seismic data processing, and systems corresponding thereto. For example, the disclosed computing device and method could be integrated into a variety of seismic survey and processing systems including land, marine, ocean bottom, and transitional zone systems with either cabled or autonomous data acquisition nodes. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations and sequences with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for processing seismic data corresponding to a subsurface, the method comprising:
    receiving input seismic data ($d_i$) characterized by N spatial coordinates, wherein the input seismic data is in a first spatial domain, and the N spatial coordinates describe positions of (1) seismic sources that generate seismic waves, and (2) seismic receivers that detect the seismic waves after have been passed through the subsurface;
    expanding with a computer the N spatial coordinates of the input seismic data ($d_i$) to N' modified spatial coordinates, where N' is greater than N, to provide spatially expanded seismic data ($d_e$) that is in a second spatial domain;
    transforming the spatially expanded seismic data ($d_e$) to a model domain to provide model domain data ($d_m$); and
    generating a final image ($d_f$) of the subsurface using the model domain data ($d_m$),
    wherein the N' modified spatial coordinates include plural modified coordinates, each of which is a non-linear function of two of the N spatial coordinates, and
    wherein the plural modified spatial coordinates replace non-linear responses of the input seismic data ($d_i$) in the first spatial domain with pseudo-linear responses in the second spatial domain.

2. The method of claim 1, wherein using the model domain data ($d_m$) comprises de-noising the model domain data ($d_m$).

3. The method of claim 2, wherein de-noising comprises adjusting coefficients of the model to suppress noise.

4. The method of claim 2, wherein de-noising comprises suppressing noise that is coherent or random.

5. The method of claim 1, wherein the model domain is selected from the group consisting of a slowness domain, a wavenumber domain, a frequency domain, a q-domain, an r-domain, an s-domain, a hyperbolic domain, a shifted apex hyperbolic domain, a horizontal transverse isotropy (HTI) domain, a vertical transverse isotropy (VTI) domain, an orthorhombic anisotropy domain, and a CRS parameters domain.

6. The method of claim 1, wherein using the model domain data ($d_m$) comprises inverse transforming the model domain data ($d_m$) or a processed variation thereof to an output domain to provide output seismic data ($d_o$).

7. The method of claim 6, where the output domain comprises regularized or non-regularized coordinates.

8. The method of claim 6, wherein the model domain data ($d_m$) comprises a noise model and wherein the final image ($d_f$) of the subsurface is computed by subtracting the output seismic data ($d_o$) from the input seismic data ($d_i$) or the spatially expanded seismic data ($d_e$).

9. The method of claim 1, wherein the model domain comprises coordinates corresponding to the N' modified spatial coordinates.

10. The method of claim 9, wherein the N spatial coordinates comprise an inline midpoint ($m_x$), cross-line midpoint ($m_y$), inline offset ($h_x$) and a cross-line offset ($h_y$) and wherein the N' modified spatial coordinates comprise coordinates $m'_x$, $m'_y$, q, r, and s corresponding to $m_x$, $m_y$, $(h_x^2+h_y^2)$, $(h_x^2-h_y^2)$ and $(2 \cdot h_x \cdot h_y)$, respectively.

11. The method of claim 10, wherein the model domain data comprises parameters $p_x$, $p_y$, Q, R, and S corresponding to $m'_x$, $m'_y$, q, r, and s, respectively.

12. The method of claim 1, wherein transforming the spatially expanded seismic data ($d_e$) to the model domain comprises performing an anti-leakage transform.

13. The method of claim 1, wherein using the model domain data (dm) comprises estimating velocity parameters for the subsurface.

14. A method for processing seismic data corresponding to a subsurface, the method comprising:
    receiving input seismic data ($d_i$) characterized by N spatial coordinates, wherein the input seismic data is in a first spatial domain, and the N spatial coordinates describe positions of (1) seismic sources that generate seismic waves, and (2) seismic receivers that detect the seismic waves after have been passed through the subsurface;
    expanding the N spatial coordinates of the input seismic data ($d_i$) to N' modified spatial coordinates, where N' is greater than N, to provide spatially expanded seismic data ($d_e$) that is in a second spatial domain;
    transforming the spatially expanded seismic data ($d_e$) to a model domain to provide model domain data ($d_m$);
    inverse transforming the model domain data ($d_m$) or a processed variation thereof to an output domain to provide output seismic data ($d_o$); and
    generating a final image ($d_f$) of the subsurface using the output seismic data ($d_o$),
    wherein the N' modified spatial coordinates include modified plural coordinates, each of which is a non-linear function of two of the N spatial coordinates, and
    wherein the plural modified spatial coordinates replace non-linear responses of the input seismic data ($d_i$) in the first spatial domain with pseudo-linear responses in the second spatial domain.

15. A computing device configured to process seismic data corresponding to a subsurface, the computing device comprising:
    an interface configured to receive input seismic data ($d_i$) characterized by N spatial coordinates, wherein the input seismic data is in a first spatial domain, and the N spatial coordinates describe positions of (1) seismic sources that generate seismic waves, and (2) seismic receivers that detect the seismic waves after have been passed through the subsurface;
    a processor configured to expand the N spatial coordinates of the input seismic data ($d_i$) to N' modified spatial coordinates, where N' is greater than N, to provide spatially expanded seismic data ($d_e$) that is in a second spatial domain;

the processor configured to transform the spatially expanded seismic data ($d_e$) to a model domain to provide model domain data ($d_m$); and the processor configured to generate a final image of the subsurface using the model domain data ($d_m$), wherein the N' modified spatial coordinates include plural modified coordinates, each of which is a non-linear function of two of the N spatial coordinates, and wherein the plural modified spatial coordinates replace non-linear responses of the input seismic data ($d_i$) in the first spatial domain with pseudo-linear responses in the second spatial domain.

16. The computing device of claim 15, wherein the processor is configured to de-noise the model domain data ($d_m$).

17. The computing device of claim 15, wherein the model domain is selected from the group consisting of a slowness domain, a wavenumber domain, a frequency domain, a q-domain, an r-domain, an s-domain, a hyperbolic domain, a shifted apex hyperbolic domain, a horizontal transverse isotropy (HTI) domain, a vertical transverse isotropy (VTI) domain, an orthorhombic anisotropy domain, and a CRS parameters domain.

18. The computing device of claim 15, wherein the processor is configured to inverse transform the model domain data ($d_m$) or a processed variation thereof to an output domain to provide output seismic data ($d_o$).

19. The computing device of claim 18, where the output domain comprises regularized or non-regularized coordinates.

20. The computing device of claim 15, wherein the N spatial coordinates comprise an inline midpoint ($m_x$), cross-line midpoint ($m_y$), inline offset ($h_x$) and a cross-line offset ($h_y$) and wherein the N' spatial coordinates comprise coordinates $m'_x$, $m'_y$, q, r, and s corresponding to $m_x$, $m_y$, $(h_x^2+h_y^2)$, $(h_x^2-h_y^2)$ and $(2 \cdot h_x \cdot h_y)$, respectively and wherein the model domain data comprises parameters $p_x$, $p_y$, Q, R, and S corresponding to $m'_x$, $m'_y$, q, r, and s, respectively.

* * * * *